United States Patent
Ohashi

(10) Patent No.: US 9,596,121 B2
(45) Date of Patent: Mar. 14, 2017

(54) SERVER APPARATUS COMMUNICATING WITH A CLIENT APPARATUS VIA THE INTERNET, SYSTEM, AND CONTROL METHOD THEREOF

(71) Applicant: CANON KABUSHIKI KAISHA, Tokyo (JP)

(72) Inventor: Toshio Ohashi, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 325 days.

(21) Appl. No.: 14/116,216

(22) PCT Filed: Feb. 27, 2013

(86) PCT No.: PCT/JP2013/056045
§ 371 (c)(1),
(2) Date: Nov. 7, 2013

(87) PCT Pub. No.: WO2013/168458
PCT Pub. Date: Nov. 14, 2013

(65) Prior Publication Data
US 2014/0201263 A1    Jul. 17, 2014

(30) Foreign Application Priority Data

May 10, 2012    (JP) .................. 2012-108912

(51) Int. Cl.
*G06F 15/16*    (2006.01)
*H04L 29/06*    (2006.01)
*H04L 29/08*    (2006.01)

(52) U.S. Cl.
CPC ...... *H04L 29/06047* (2013.01); *H04L 67/141* (2013.01); *G06F 2221/2105* (2013.01)

(58) Field of Classification Search
CPC ....... G06F 2221/2105; H04L 29/06047; H04L 67/141
See application file for complete search history.

(56) References Cited

U.S. PATENT DOCUMENTS 5,950,127 A * 9/1999 Nitta .................. H04B 7/18563
455/427
8,812,733 B1 * 8/2014 Black ...................... G06F 9/541
709/203

(Continued)

FOREIGN PATENT DOCUMENTS

| EP | 0762669 B1 | 6/2011 |
|---|---|---|
| JP | H10-126409 A | 5/1998 |

(Continued)

OTHER PUBLICATIONS iPhone User's Guide IOS 3.1, Apple, Sep. 9, 2009, pp. 18, 63 and 151.*

(Continued)

*Primary Examiner* — Moustafa M Meky
*Assistant Examiner* — Thorne E Waugh
(74) *Attorney, Agent, or Firm* — Canon USA, Inc. IP Division

(57) ABSTRACT

A server apparatus receives a query from a client apparatus connected via the Internet, and as its reply, it transmits first condition information according to which initial communication is performed in order to switch to a specific communication format in which instruction from the server apparatus is possible without a request of the client apparatus.

23 Claims, 12 Drawing Sheets

(56) References Cited

U.S. PATENT DOCUMENTS

| | | | | |
|---|---|---|---|---|
| 2002/0052938 A1* | 5/2002 | Kanemitsu | .......... | H04L 41/0253 |
| | | | | 709/220 |
| 2007/0061878 A1* | 3/2007 | Hagiu | .................. | G06F 21/42 |
| | | | | 726/14 |
| 2007/0294228 A1* | 12/2007 | Kawana | .................. | H04L 41/28 |
| 2010/0281107 A1* | 11/2010 | Fallows | .................... | G06F 9/54 |
| | | | | 709/203 |
| 2010/0299338 A1* | 11/2010 | Aarni | ...................... | H04W 8/22 |
| | | | | 707/759 |
| 2013/0097239 A1* | 4/2013 | Brown | .................... | H04L 67/02 |
| | | | | 709/204 |
| 2014/0214967 A1* | 7/2014 | Baba | ...................... | H04H 20/08 |
| | | | | 709/205 |

FOREIGN PATENT DOCUMENTS

| | | |
|---|---|---|
| JP | 2000-293452 A | 10/2000 |
| JP | 2002-252614 A | 9/2002 |
| JP | 2004-157960 A | 6/2004 |
| JP | 2007-334612 A | 12/2007 |
| JP | 2009-508261 A | 2/2009 |
| JP | 2011-130283 A | 6/2011 |
| JP | 2012-525659 A | 10/2012 |
| WO | 03/065199 A | 8/2003 |
| WO | 2007/026657 A | 3/2007 |
| WO | 2007/033087 A | 3/2007 |
| WO | 2010/127327 A | 11/2010 |

OTHER PUBLICATIONS

Internet Engineering Task Force (IETF) RFC 6455: The WebSocket protocol (URL : http://tools.ietf.org/html/rfc6455).

* cited by examiner

FIG. 3A

SERVICE MANAGEMENT TABLE ~300

| SERVICE ID | SERVICE NAME |
|---|---|
| 1 | FIRMWARE DISTRIBUTION SERVICE |
| 2 | SETTING INFORMATION DISTRIBUTION SERVICE |

FIG. 3B

CLIENT COMPUTER MANAGEMENT TABLE ~301

| CLIENT ID | CLIENT NAME | IP ADDRESS |
|---|---|---|
| 1 | Client Computer 1 | 192.168.0.10 |
| 2 | Client Computer 2 | 192.168.0.20 |
| 3 | Client Computer 3 | 192.168.0.30 |

FIG. 3C

CLIENT COMPUTER SERVICE MANAGEMENT TABLE ~302

| CLIENT ID | SERVICE ID |
|---|---|
| 1 | 1 |
| 1 | 2 |

FIG. 3D

PRINTER MANAGEMENT TABLE ~303

| PRINTER ID | PRINTER NAME | INSTALLATION LOCATION | MODEL ID | IP ADDRESS |
|---|---|---|---|---|
| 1 | Network Printer 1 | Tokyo Office 1 | 1 | 192.168.0.40 |
| 2 | Network Printer 2 | Tokyo Office 1 | 1 | 192.168.0.50 |
| 3 | Network Printer 3 | Osaka Office 1 | 1 | 192.168.0.60 |

FIG. 3E

CLIENT COMPUTER PRINTER MANAGEMENT TABLE ~304

| CLIENT ID | PRINTER ID |
|---|---|
| 1 | 1 |
| 1 | 2 |
| 1 | 3 |

FIG. 3F

SETTING INFORMATION MANAGEMENT TABLE 305

| SETTING INFORMATION ID | MODEL ID | SNMPv1 SETTING | MIB ACCESS SETTING | SNMPv3 SETTING | MANAGEMENT PASSWORD SETTING | INSTALLATION LOCATION |
|---|---|---|---|---|---|---|
| 1 | 1 | TRUE | R/W | FALSE | xxxxxxxx | Tokyo Office 1 |
| 2 | 2 | FALSE | R/W | TRUE | xxxxxxxx | Osaka Office 1 |

FIG. 3G

FIRMWARE MANAGEMENT TABLE 306

| FIRMWARE ID | MODEL ID | FIRMWARE VERSION | FILE PATH | RELEASE DATE/TIME |
|---|---|---|---|---|
| 1 | 1 | 10.11 | /1/10.11/firmware.zip | 2012/4/1 0:00:00 GMT |
| 2 | 2 | 2.48 | /2/2.48/firmware.zip | 2012/4/10 12:00:00 GMT |

FIG. 3H

SETTING INFORMATION DISTRIBUTION TASK MANAGEMENT TABLE 307

| TASK ID | PRINTER ID | SETTING INFORMATION ID | RESULT | DATE/TIME |
|---|---|---|---|---|
| 1 | 1 | 1 | OK | 2012/3/1 11:30:00 GMT |
| 2 | 2 | 1 | OK | 2012/3/1 11:30:00 GMT |

FIG. 3I

FIRMWARE DISTRIBUTION TASK MANAGEMENT TABLE 308

| TASK ID | PRINTER ID | FIRMWARE ID | RESULT | DATE/TIME |
|---|---|---|---|---|
| 1 | 1 | 1 | OK | 2012/4/1 0:05:00 GMT |
| 2 | 2 | 1 | OK | 2012/4/1 0:10:00 GMT |

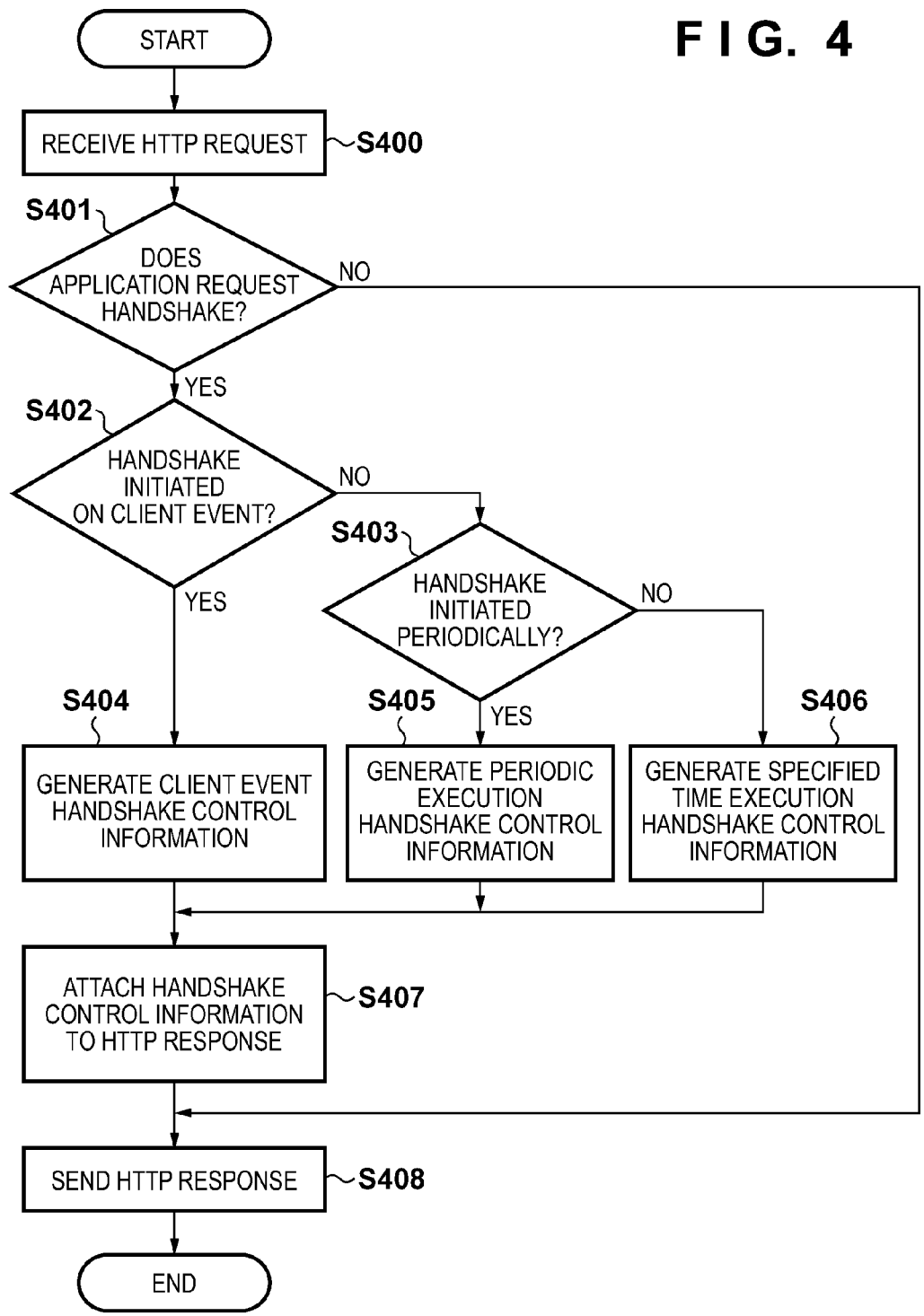

FIG. 5

```
<handshake>
  <eventdriven>
    <assembly>printerdiscovery.dll</assembly>
    <class>printerDiscovery</class>
    <event>NewPrinterDiscovered</event>
  </eventdriven>
</handshake>
```
~500

```
<handshake>
  <periodically>
    <start>2012/04/01 0:00 GTM</start>
    <end>2012/04/01 12:00 GTM</end>
    <intervalMillisec>300000</intervalMillisec>
  </periodically>
</handshake>
```
~501

```
<handshake>
  <specified>
    <start>2012/04/01 0:00 GTM</start>
  <specified>
</handshake>
```
~502

FIG. 8

```
<handshake>
  <eventdriven>
    <assembly>printerdiscovery.doll/assembly>
    <class>printerDiscovery/class>
    <event>NewPrinterDiscovered</event>
  </eventdriven>
  <close>false</close>
</handshake>
```
~800

```
<handshake>
  <periodically>
    <start>2012/04/01 0:00 GTM</start>
    <end>2012/04/01 12:00 GTM</end>
    <intervalMillisec>300000</intervalMillisec>
  </periodically>
  <close>false</close>
</handshake>
```
~801

```
<handshake>
  <specified>
    <start>2012/04/01 0:00 GMT</start>
    <specified>
    <close>true</close>
</handshake>
```
~802

SERVER APPARATUS COMMUNICATING WITH A CLIENT APPARATUS VIA THE INTERNET, SYSTEM, AND CONTROL METHOD THEREOF

TECHNICAL FIELD

The present invention relates to a server apparatus that communicates via the Internet with a client apparatus, to a system, and to a control method thereof.

BACKGROUND ART

Conventionally, amongst methods of establishing a connection in client/server systems, there is a method of identifying the security protocol (for example SSL) activated by the transmitting side based on a connection request received by the receiving side, and using the appropriate protocol to establish the connection. Then messages are encrypted and communication is performed. See, for example, Japanese Patent Laid-Open No. 2009-508261.

Furthermore, a Push communication method has been proposed in which with the starting point of a handshake from a client, communication is performed, from a server on the Internet to a client on an intranet within a firewall, by persistently maintaining a communication connection. See, for example, Internet Engineering Task Force (IETF) RFC 6455: The WebSocket protocol (URL: http://tools.ietf.org/html/rfc6455).

When carrying out the Push communication, and communication connections are persistently maintained between clients and the server, on the server, resources such as memory, CPU and connections continue to be consumed proportionally to the number of clients with which communication is performed. So, in view of resource consumption efficiency on the server, it is desirable to establish the communication connection by performing the handshake from the client only after a time when the Push communication has become necessary, and to release the communication connection when the Push communication has completed.

However, with the conventional methods of establishing connections in client/server systems, it was not possible to instruct from the server to the client so that it would initiate the handshake at the timing of performing the Push communication.

SUMMARY OF INVENTION

The present invention provides a method in which between a client apparatus and a server apparatus performing communication via the Internet, it is possible to switch to a specific communication method including the Push communication described above at an appropriate timing, considering resources on the server apparatus side.

According to an aspect of the present invention, there is provided a server apparatus that communicates with a client apparatus via the Internet, the server apparatus comprising: receiving means for receiving a query from the client apparatus; transmitting means for transmitting, as a reply to the received query, first condition information according to which to perform an initial communication in order to switch to a specific communication method by which instruction from the server apparatus is possible without a request from the client apparatus; and instructing means for switching to the specific communication method by performing the initial communication with the client apparatus according to the first condition information, and making a transmission instruction to the client apparatus by the specific communication method.

According to another aspect of the present invention, there is provided a control method for controlling a server apparatus that communicates with a client apparatus via the Internet, the control method comprising steps of: receiving a query from the client apparatus; transmitting, as a reply to the received query, first condition information according to which to perform an initial communication in order to switch to a specific communication method by which instruction from the server apparatus is possible without a request from the client apparatus; and switching to the specific communication method by performing the initial communication with the client apparatus according to the first condition information, and making a transmission instruction to the client apparatus by the specific communication method.

According to still another aspect of the present invention, there is provided a system having a client apparatus and a server apparatus that communicates with the client apparatus via the Internet, wherein the server apparatus comprises: receiving means for receiving a query from the client apparatus; transmitting means for transmitting, as a reply to the received query, first condition information according to which to perform an initial communication in order to switch to a specific communication method by which instruction from the server apparatus is possible without a request from the client apparatus; and instructing means for switching to the specific communication method by performing the initial communication with the client apparatus according to the first condition information, and making a transmission instruction to the client apparatus by the specific communication method even if there is no request from the client apparatus, and wherein the client apparatus comprises: receiving means for receiving from the server apparatus the first condition information and control means for initiating the initial communication with the server apparatus according to the first condition information received by the receiving means.

According to yet another aspect of the present invention, there is provided a control method for a system having a client apparatus and a server apparatus that communicates with the client apparatus via the Internet, wherein the server apparatus executes steps of: receiving a query from the client apparatus; transmitting, as a reply to the received query, first condition information according to which to perform an initial communication in order to switch to a specific communication method by which instruction from the server apparatus is possible without a request from the client apparatus; and switching to the specific communication method by performing the initial communication with the client apparatus according to the first condition information, and making a transmission instruction to the client apparatus by the specific communication method even if there is no request from the client apparatus, and wherein the client apparatus executes steps of: receiving from the server apparatus the first condition information; and initiating the initial communication with the server apparatus according to the received first condition information.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 3A to 3I are views for illustrating table configuration examples within a database server service module.

FIG. 4 is a flowchart for describing processing for receiving a request according to a first embodiment.

FIG. 5 is a view for illustrating an example of handshake control information according to the first embodiment.

FIG. 8 is a view for illustrating an example of handshake control information according to the second embodiment.

DESCRIPTION OF EMBODIMENTS

Figure 1:
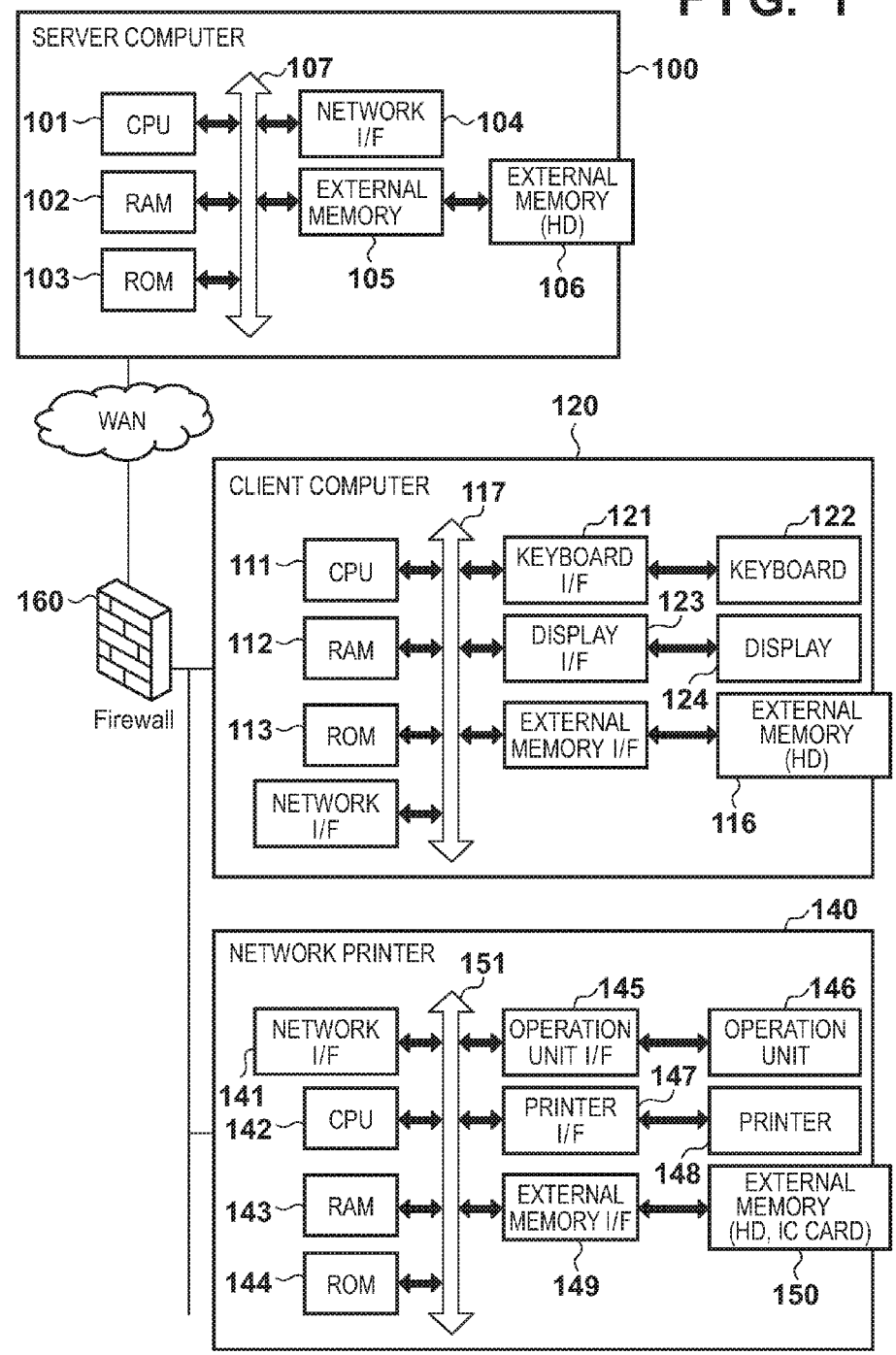
FIG. 1 is a block diagram for illustrating a system configuration and a hardware configuration of a Push communication type client/server system.

Embodiments of the present invention will be described hereinafter in detail, with reference to the accompanying drawings. In the following embodiments, explanation is given using the example of a Push communication type client/server system. Note, for the protocol of the Push communication, the specific communication method of WebSocket is used.

With bidirectional communication according to WebSocket, command transmission by a Push from a server apparatus on the Internet is possible. Furthermore, even if there is no query (request) from a client apparatus, command transmission is possible, and when bidirectional communication is performed, header information and the like can be omitted, and the data amount that flows over the network can be reduced. However, when the resources of a server apparatus are scarce, there is the problem that it is difficult for the server apparatus to manage multiple client apparatuses.

First Embodiment

Firstly, explanation will be given using the system configuration and the hardware configuration of the Push communication type client/server system illustrated in the block diagram of FIG. 1. The Push communication type client/server system provides a client computer 120, a network printer 140, a firewall 160 connected via a LAN, and a server computer 100 connected via a WAN.

Note, the server computer 100 and the client computer 120 have the configurations of general purpose computers (for example personal computers).

Furthermore, the client computer 120 is an image forming apparatus such as a personal computer or a digital multifunction peripheral.

On the server computer 100, a CPU 101 executes various types of processing according to application programs stored in a ROM 103, or an external memory 106. Furthermore, the CPU 101 centrally controls each device on a system bus 107. A RAM 102 is a main memory of the CPU 101 and functions as a work area, etcetera. The ROM 103 is a read-only memory that functions as a storage for a basic I/O program, etcetera. An operating system (hereinafter referred to as OS) which is a control program of the CPU 101 is stored in the ROM 103 or in the external memory 106. Furthermore, in the ROM 103 or in the external memory 106, files used during processing based on application programs and other kinds of data are stored.

A network I/F 104 connects to a network and controls network communication. An external memory I/F 105 controls access to the external memory 106, which may be a hard disk (HD). The external memory 106 stores a boot program, various types of applications, user files, editing files, etcetera.

The client computer 120 operates in a state in which a CPU 111 executes a basic I/O program or OS written into a ROM 113 or an external memory 116. A basic I/O program is written into the ROM 113, and an OS is written into the ROM 113 or the external memory 116. When the power supply of the client computer 120 is turned ON, according to an initial program load function of the basic I/O program, the OS is written into a RAM 112 from the ROM 113 or the external memory 116, and the operation of the OS initiates. A system bus 117 connects each of the devices.

Also, in the client computer 120 a keyboard I/F 121 controls input from a keyboard 122, a pointing device (not shown), etcetera. A display I/F 123 controls the display of a display 124. The CPU 111, opens various registered windows based on commands instructed with a mouse cursor (not shown) on the display 124, and executes various data processing.

In the network printer 140, a network I/F 141 connects to a network and controls network communication. A CPU 142 outputs image signals as output information to a printer 148 connected via a printer I/F 147 to a system bus 151 based on a control program. Note, the control program is stored in a ROM 144 or an external memory 150.

The CPU 142 is configured so that processing for communication with the client computer 120 via the network I/F 141 is possible, and so that the client computer 120 can be notified of information in the network printer 140. Furthermore, the CPU 142 executes processing based on application programs stored in the ROM 144 or in the external memory 150. A RAM 143 is a main memory of the CPU 142, and functions as a work memory, etcetera, and a configuration is taken such that memory capacity can be expanded with an option RAM connected to an expansion port (not shown). Note, the RAM 143 is used as an output information loading area, an environment data storage area, an NVRAM. In the ROM 144 or in the external memory 150, the control program of the CPU 142, font data used when the CPU 142 generates output information, and information used on the network printer 140 are stored.

An operation unit I/F 145 is an interface with an operation unit 146, and it outputs to the operation unit 146 image data to be displayed. Also, the operation unit I/F 145 receives information input by a user via the operation unit 146. The operation unit 146 corresponds to an operation panel, on which switches, LED display devices, etcetera are arranged. The printer I/F 147 outputs image signals as output information to the printer 148 (printer engine). An external memory I/F (memory controller) 149 controls access to the external memory 150 which comprises a hard disk (HD) or an IC card, etcetera. Also, regarding the external memory 150, the number of the external memories is not limited to 1, but at least one external memory is provided, and configuration can be such that multiple option font cards that add to built-in fonts, or external memories that store language related programs that interpret different printer control languages can be connected. Further, there may be an NVRAM (not shown), that stores printer mode setting information instructed from the operation unit 146. The system bus 151 connects each of the devices.

Next, a software configuration of the Push communication type client/server system will be explained using the block diagram illustrated in FIG. 2. First, a software configuration of the server computer 100 is illustrated.

In the server computer 100, an application 205 and modules 200, 204, 210 exist as files stored in the external memory 106. These are program modules that are loaded into the RAM 102 by the OS and by modules that use modules of the OS upon execution. Also, the application 205 can be added to the HD of the external memory 106 via a CD-ROM (not shown) or a network.

A network module 200 performs network communication with the client computer 120. This network module 200 includes a TCP/IP module 201, an HTTP module 202 and a WebSocket module 203. The TCP/IP module 201 performs network communication by the TCP/IP protocol. The HTTP module 202 uses TCP as a transport protocol and performs network communication by the HTTP protocol. The WebSocket module 203 uses TCP as a transport protocol and performs network communication by the WebSocket protocol.

A Web server service module 204 provides a service in which when it receives an HTTP request from the client computer 120, it replies with an HTTP response. On the other hand, the application 205 manages the network printer 140 via the client computer 120 by sending instructions to the client computer 120. Furthermore, the application 205 is implemented as a program that, for example, replies to the HTTP request and executes processing. As described above, the application 205 realizes a Web application together with the Web server service module 204, that manages the client computer 120 and the network printer 140.

In the application 205, a search module 206 makes instructions to the client computer 120 so that it searches for the LAN connected network printer 140. Furthermore the search module 206 receives, via the network module 200, the result of searching for the network printer 140 that the client computer 120 uploaded. Also, the search module 206 stores the received search result in a database server service module 210 which is described later. A firmware distribution module 207 makes instructions to the client computer 120 so that it distributes firmware to the LAN connected network printer 140. Also, the firmware distribution module 207 receives, via the network module 200, the result of firmware distribution to the network printer 140 that the client computer 120 uploaded. Further, the firmware distribution module 207 stores the received firmware distribution result in the database server service module 210 which is described later.

A setting information distribution module 208 makes instructions to the client computer 120 so that it distributes setting information to the LAN connected network printer 140. Also, the setting information distribution module 208 receives, via the network module 200, the result of setting information distribution to the network printer 140 that the client computer 120 uploaded. Further, the setting information distribution module 208 stores the received setting information distribution result in the database server service module 210 which is described later. A handshake control information management module 209 performs the creation of handshake control information for requesting, to the client computer 120, initiation of a WebSocket protocol handshake. Note, the handshake is an initial communication for switching to a specific communication method by which instruction to the client computer 120 is possible even in the case where there is no request from the client computer 120.

The database server service module 210 manages a database, and performs data storage and retrieval in conjunction with requests from other modules. This database server service module 210 may be on a separate device from the server computer 100 if access from the application 205 is possible. An example of the table configuration in the database server service module 210 is illustrated in FIGS. 3A-3I. Note, the table configurations illustrated in FIGS. 3A-3I are only examples, and different table configurations may be adapted.

A service management table 300, in FIG. 3A, is a table that manages information related to network printer management services that the application 205 provides. The information managed by the service management table 300 is, for example, a service ID and a service name. Here, the service ID is an ID uniquely identifying a service.

A client computer management table 301, in FIG. 3B, is a table that manages information of the client computer 120 that the server computer 100 performs Push communication to. The information that this client computer management table 301 manages is, for example, a client ID, a client name and an IP address of the client. Here, the client ID is an ID that uniquely identifies the client computer 120.

A client computer service management table 302, in FIG. 3C, is a table that manages association information of the network printer management services performed by the client computer 120.

A printer management table 303, in FIG. 3D, is a table that manages information of the network printer 140 that the client computer 120 searched. The information managed by this printer management table 303 is, for example, a printer ID, a printer name, a location of installation, a model ID of the printer and an IP address of the printer. Here, the printer ID is an ID that uniquely identifies the network printer 140.

A client computer printer management table 304, in FIG. 3E, is a table that the client computer 120 searches and that manages association information of the network printer 140 that is to be the management target.

A setting information management table 305, in FIG. 3F, is a table that manages setting information that is distributed from the setting information distribution module 208 via a setting information distribution module 228 of the client computer 120 to the network printer 140. The information managed by this setting information management table 305 is, for example, a setting information ID, a model ID, an SNMPv1 setting, an MIB access setting, an SNMPv3 setting, a management password setting, a location of installation and a file server URL.

Here the setting information ID is an ID that uniquely identifies setting information. The SNMPv1 setting is a setting for whether to put the network printer 140 into a state in which it can use the SNMPv1 (Simple Network Management Protocol Version 1) protocol. Here, SNMPv1 is a protocol for monitoring/controlling the network printer 140. The MIB access setting is a setting related to access rights to the MIB (Management Information Base) of the network printer 140, and there are settings for read/write, read-only, and access not permitted.

The SNMPv3 setting is a setting for whether to put the network printer 140 into a state in which it can use SNMPv3 (Simple Network Management Protocol Version 3). Here, SNMPv3 is the latest version of SNMP, and compared to v1 security has been strengthened. The management password setting is a setting for changing the password necessary when remotely managing the network printer 140 from the initial setting. Here the management password setting is encrypted for security and stored in the setting information management table 305.

A firmware management table 306, in FIG. 3G, is a table that manages firmware information that is distributed to the network printer 140 via a firmware distribution module 227 of the client computer 120 from the firmware distribution module 207. The information managed by this firmware management table 306 is, for example, a firmware ID, a model ID, a firmware version, a file path and a release date/time. Here, the firmware ID is an ID that uniquely identifies firmware. The file path is a file path at which the actual file of the firmware is stored. The release date/time is date/time information representing a release schedule of the firmware.

A setting information distribution task management table 307, in FIG. 3H, is a table that manages tasks that perform setting information distribution to the network printer 140. The information managed by this setting information distribution task management table 307 is, for example, a task ID, a printer ID, a setting information ID, a distribution result and an execution date/time. The task ID is an ID that uniquely identifies a setting information distribution task.

A firmware distribution task management table 308, in FIG. 3I, is a table that manages tasks that perform firmware distribution to the network printer 140. The information managed by this firmware distribution task management table 308 is, for example, a task ID, a printer ID, a firmware ID, a distribution result and an execution date/time. Here, the task ID is an ID that uniquely identifies a firmware distribution task.

Next, returning to FIG. 2, a software configuration of the client computer 120 will be explained. Note, each of the modules that constitute the client computer 120 is a program module that exists as a file, each stored in the ROM 113 or the external memory 116. Further, each of the modules is loaded into the RAM 112 by the OS and by modules that use modules of the OS upon execution.

A network module 220 performs communication with the server computer 100, the network printer 140. The network module 220 includes a TCP/IP module 221, an HTTP module 222, and a WebSocket module 223. The TCP/IP module 221 performs network communication by the TCP/IP protocol. The HTTP module 222 uses TCP as a transport protocol and performs network communication by the HTTP protocol. The WebSocket module 223 uses TCP as a transport protocol and performs network communication by the WebSocket protocol.

An application 224, based on instructions received from the server computer 100, manages the network printer 140. Also, the application 224 uploads a result of management on the network printer 140 to the server computer 100. In this application 224, a handshake control information management module 225 receives/interprets handshake control information transmitted from the server computer 100. Further, according to timing specified by the handshake control information, the handshake control information management module 225 initiates handshake processing of the WebSocket protocol through the WebSocket module 223. A search module 226 receives an instruction from the server computer 100 and searches for the LAN connected network printer 140.

SNMP (Simple Network Management Protocol), SLP (Service Location Protocol) are examples of communication protocols that this search module 226 uses for searching. Other than those, communication protocols such as WS-Discovery (Web Services Dynamic Discovery) may also be used. Also, the search module 226 uploads the result of a search for the network printer 140 via the network module 220 to the server computer 100.

The firmware distribution module 227 receives instructions from the server computer 100 and distributes firmware to the LAN connected network printer 140. Also, the firmware distribution module 227 uploads to the server computer 100 via the network module 220 the result of firmware distribution to the network printer 140. The setting information distribution module 228 receives an instruction from the server computer 100 and distributes setting information to the LAN connected network printer 140. Also, the setting information distribution module 228 uploads to the server computer 100 via the network module 220 the result of setting information distribution to the network printer 140.

Next, a software configuration of the network printer 140 will be explained. In the network printer 140 each of the modules exists as a file saved in the ROM 144 or the external memory 150, and on execution, is loaded into the RAM 143 and executed. A network module 240 uses an arbitrary communication protocol to perform network communication with the client computer 120. A print processing module 241 performs reception and control of a print job transmitted from the client computer 120 and performs print processing.

A firmware management module 242 performs management of firmware of the network printer 140. When the firmware management module 242 receives a firmware distribution instruction from the firmware distribution module 227 on the client computer 120 via the network module 240, the firmware management module 242 replaces the firmware of the network printer 140 with the received firmware. Further, the firmware management module 242 returns a firmware update result as a reply to the firmware distribution module 227 on the client computer 120.

A setting information management module 243 performs management of setting information of the network printer 140. Here, the setting information is, for example, an SNMPv1 setting, an MIB access setting, an SNMPv3 setting, a management password setting or a location of installation. When the setting information management module 243 receives setting information from the setting information distribution module 228 on the client computer 120 via the network module 240, the setting information management module 243 replaces the setting of the network printer 140 with the received setting. Further, the setting information management module 243 returns a setting information update result as a reply to the setting information distribution module 228 on the client computer 120.

Operation when the server computer 100 receives an HTTP request transmitted from the client computer 120 in the configuration above, will be explained using the flowchart illustrated in FIG. 4. A program that executes this processing is stored in the ROM 103 or in the external memory 106 and is loaded into the RAM 102 upon execution. Also, by the CPU 101 executing this program, the processing described by this flowchart is realized.

In step S400, the HTTP module 202 receives an HTTP request from the client computer 120 via the TCP/IP module 201. In step S401, the handshake control information management module 209 determines whether the application 205 is requesting a handshake. The determination of whether the application 205 is requesting a handshake can be determined based on values stored in the tables of the database server service module 210.

Here, a case may be considered in which the client computer 120 and a firmware distribution service are associated by the client computer service management table 302, and the firmware management table 306 registers scheduled releases in the near future. When firmware is released, it is desirable for the application 205 to distribute the firmware as soon as possible via the client computer 120 with a Push communication to the network printer 140. So, in this example, the handshake control information management module 209 determines that there is a handshake request.

Also, as another example, a case may be considered in which the number of tasks scheduled to be executed that are registered in the setting information distribution task management table 307 and the firmware distribution task management table 308 within a specified period of time is greater than or equal to a predetermined number. In a normal case, the application 224 of the client computer 120 periodically accesses the server computer 100 (polling), and the client computer 120 acquires task information registered in the server computer 100 and executes the task. However, in the case where there are more registered tasks on the server computer 100, it is desirable for the server computer 100 to instruct, by a Push communication, the client computer 120 to execute a task. Thus, in this example as well, the handshake control information management module 209 determines that there is a handshake request.

Furthermore, as another example, a case may be considered in which the client computer 120 and the setting distribution service are newly associated in the client computer service management table 302. In this case, it is desirable that when the application 224 of the client computer 120 newly searches for the network printer 140, initialization settings are distributed to the network printer 140 immediately by a Push communication. Thus, in this example as well, the handshake control information management module 209 determines that there is a handshake request.

As described above, the handshake control information management module 209 determines whether the application 205 is requesting a handshake based on values stored in the tables of the database server service module 210. Note, the handshake control information management module 209 may also determine whether the application 205 is requesting a handshake based on information other than values stored in the tables of the database server service module 210. In this case, the handshake control information management module 209 may make the determination based on resource consumption of memory, hard disk on the server computer 100, and/or congested network bandwidth conditions.

In step S401, in the case where it is determined that the application 205 is requesting a handshake, the processing proceeds to step S402, and when that is not the case, the processing proceeds to step S408. In step S402, the handshake control information management module 209 determines whether the handshake that the application 205 requested is initiated by the trigger of an event on the client computer 120. In the above described example, in the case where firmware is first distributed by a Push communication when firmware is released, a handshake is initiated triggered by the firmware release on the server computer 100. Thus, in step S402, the handshake control information management module 209 determines that the handshake is not initiated triggered by an event on the client computer 120.

Next, in the case where task execution is instructed by a Push communication from the server computer 100, a handshake is initiated triggered by the number of registered tasks on the server computer 100 becoming greater than or equal to a predetermined number. So, in this case as well, in step S402, the handshake control information management module 209 determines that the handshake is not initiated triggered by an event on the client computer 120.

Finally, in the case where an initialization setting is distributed to the network printer 140 that was newly searched, if the client computer 120 searched for the network printer 140, a handshake is to be initiated triggered by the discovery of the network printer. So, in step S402, the handshake control information management module 209 determines that the handshake is initiated triggered by an event on the client computer 120.

In step S402, in the case where the handshake is determined to be initiated triggered by an event on the client computer 120, the processing proceeds to step S404, and when that is not the case the processing proceeds to step S403. In step S403 the handshake control information management module 209 determines whether the handshake that the application 205 requests, is periodically initiated. In the above described example, in the case where firmware is first distributed by a Push communication when firmware is released, firmware distribution is only performed once. So, in step S403, the handshake control information management module 209 determines that the handshake is not periodically initiated.

On the other hand, in the case where task execution is instructed from the server computer 100 by a Push communication, task execution is periodically instructed until the number of registered tasks on the server computer 100 becomes less than a predetermined number. So, in this case, in step S403, the handshake control information management module 209 determines that the handshake is periodically initiated.

In step S403, in the case where it is determined that the handshake is periodically initiated, the processing proceeds to step S405, and when that is not the case, the processing proceeds to step S406. In step S404, step S405, or step S406, the handshake control information management module 209 generates handshake control information. An example of this handshake control information is illustrated in FIG. 5. Note, in FIG. 5, an example is illustrated in which the description is in an XML format, but the description may be done other formats as well. Also, regarding the first condition that is a trigger for initiation of the handshake, explanation will be made in steps S404 through step S406.

In step S404, the handshake control information management module 209 generates handshake control information specified in order to initiate a handshake triggered by an event on the client computer 120. An example of handshake control information specified in order to initiate a handshake triggered by an event on the client computer 120 is illustrated in 500 of FIG. 5. In this example, the assembly, class and event, which are the triggers of handshake initiation, are described in the XML format, and it is described that the event occurs when a network printer is discovered.

In step S405, the handshake control information management module 209 generates handshake control information specified in order to periodically initiate a handshake after a specified time. An example of handshake control information specified in order to periodically initiate a handshake after the specified amount of time is illustrated in 501 of FIG. 5. In this example, the initiation time, finishing time, and period of the handshake are described in the XML format, and it is described that a handshake be initiated in five minute intervals starting on 2012/04/01 at 0:00 and ending at 12:00.

In step S406, the handshake control information management module 209 generates handshake control information specified in order to initiate a handshake only once at a specified time. An example of handshake control information specified in order to initiate a handshake only once at a specified time is illustrated in 502 of FIG. 5. In this example, the initiation time of the handshake is described in the XML format, and it is described that the handshake be initiated on 2012/04/01 at 0:00.

In step S407, the handshake control information management module 209 attaches the handshake control information generated in one of steps S404 to step S406 to the HTTP response generated by the HTTP module 202. Here, regarding the attaching of the handshake control information to the HTTP response, it can be included in, for example, the HTTP header or body. Next, in step S408, the HTTP module 202 transmits the HTTP response to the client computer 120, and this processing completes.

Note, an example was given in which a predetermined event, schedule information, and periods were predetermined as the first trigger conditions for performing a WebSocket handshake (initialization communication), but the present invention is not limited to this.

Next, operation for when the client computer 120 transmits the HTTP request to the server computer 100, and based on the received HTTP response, registers a handshake initiation will be explained using the flowchart described in FIG. 6. A program that executes this processing is stored in the ROM 113 or in the external memory 116 and is loaded into the RAM 112 upon execution. Also, by the CPU 111 executing this program, the processing illustrated by this flowchart is realized.

In step S600, the HTTP module 222 transmits an HTTP request to the server computer 100 via the TCP/IP module 221. In step S601, the HTTP module 222 receives an HTTP response transmitted from the server computer 100 via the TCP/IP module 221. In step S602, the handshake control information management module 225 determines whether handshake control information is attached to the HTTP response received in step S601. In the case where the handshake control information is attached, the processing proceeds to step S603, and in the case where it is not attached, the processing finishes there.

In step S603, the handshake control information management module 225 obtains the handshake control information from the HTTP response. Next, in step S604, the handshake control information management module 225 determines whether or not the obtained handshake control information describes that a handshake is initiated triggered by an event on the client computer 120. In the case where the result of the determination is that the handshake control information describes that a handshake is initiated triggered by an event on the client computer 120, the processing proceeds to step S606, and when that is not the case the processing proceeds to step S605.

In step S605, the handshake control information management module 225 determines whether or not the obtained handshake control information describes that after a specified time, a handshake is periodically initiated. In the case where the result of the determination is that handshake control information describes that after a specified time, a handshake is periodically initiated, the processing proceeds to step S607, and when that is not the case, the processing proceeds to step S608. In steps S606, S607 or step S608, the handshake control information management module 225 registers the initiation of the handshake with the WebSocket module 223.

In step S606, the handshake control information management module 225 registers to the WebSocket module 223 a handshake initiation in order that a handshake be initiated triggered by an event on the client computer 120. Also, in step S607, the handshake control information management module 225 registers to the WebSocket module 223 a handshake initiation in order that a handshake be initiated periodically after a specified time. Further, in step S608, the handshake control information management module 225 registers to the WebSocket module 223 a handshake initiation in order that a handshake be initiated only once at a specified time.

With the above processing, when performing a Push communication, it is possible to instruct in order to initiate a handshake for performing a Push communication from the server computer 100 to the client computer 120. Thus, the time over which a persistent communication connection is maintained between the server computer 100 and the client computer 120 for performing a Push communication can be shortened. For this reason, consumption of resources on the server computer 100 such as memory and CPU usage, and connections, etcetera, can be suppressed.

Second Embodiment

In the first embodiment, by only instructing a handshake initiation to the client computer 120 from the server computer 100 for when a Push communication is performed, the Push communication was realized without consuming more server resources than is necessary.

In the second embodiment, processing in which the server computer 100 itself checks a registered Push communication task and, if the execution schedule interval of the task is within a fixed time period, makes a WebSocket session KeepAlive instruction will be explained. With this WebSocket session KeepAlive instruction, Close processing after the Push communication finishes is skipped, and by continuing to use the connection without closing it for subsequent Push communications, it is possible to cut down on CPU load and time waste.

Figure 2:
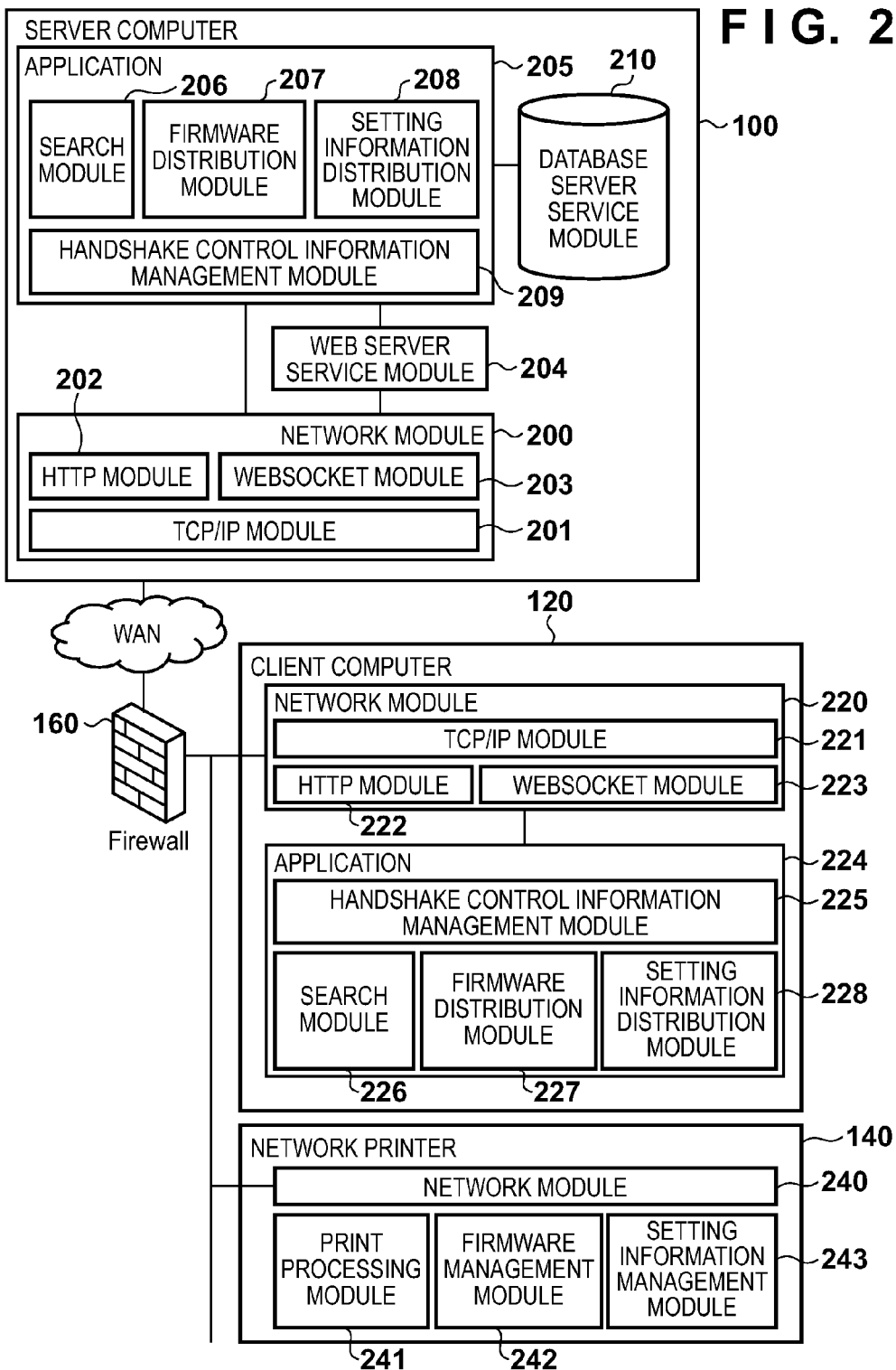
FIG. 2 is a block diagram for illustrating a software configuration of the system illustrated in FIG. 1.

Because the system configuration and hardware configuration/software configuration of the Push communication type client/server system of the second embodiment are the same as those of the FIG. 1 and FIG. 2 of the first embodiment, their explanation is omitted.

Figure 7:
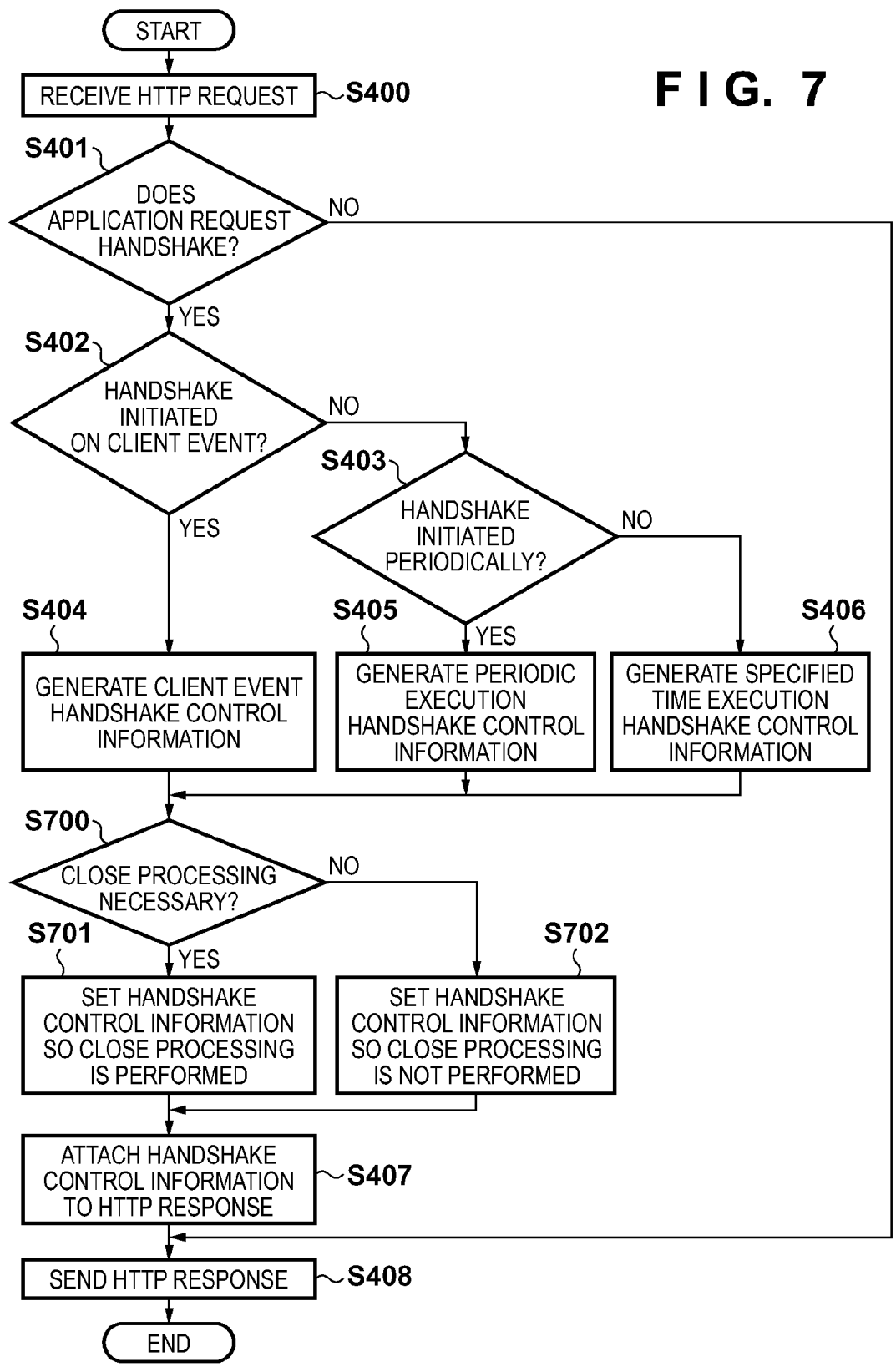
FIG. 7 is a flowchart for describing processing for receiving a request according to a second embodiment.

Firstly, operation of the server computer 100 when the server computer 100 receives an HTTP request transmitted from the client computer 120 will be described using the flowchart shown in FIG. 7. Note, part of this explanation overlaps with FIG. 4 of the first embodiment, and processing steps that are common to FIG. 4 are shown with similar reference numerals, and their explanation is omitted, and only the differing parts will be described below. Note, a program that executes this processing is stored in the ROM 103 or in the external memory 106 and is loaded into the RAM 102 upon execution. Also, by the CPU 101 executing this program, the processing illustrated by this flowchart is realized.

In step S700, the handshake control information management module 209 determines whether Close processing after the finishing of a Push communication is necessary. Here the determination of whether Close processing after the finishing of a Push communication is necessary is, for example, a determination of whether a task scheduled to be executed at intervals within a predetermined threshold time period is registered to the setting information distribution task management table 307 or to the firmware distribution task management table 308. However, after a Push communication finishes, and Close processing is performed, it ends up being necessary to perform a handshake in order to once again perform a Push communication after only a small interval of time, and CPU resources on the server computer 100 are consumed. Here, in the case where a task scheduled to be executed at intervals within a predetermined threshold time period is registered with the setting information distribution task management table 307 or the firmware distribution task management table 308, because it is more efficient to maintain the connection, it is determined that the Close processing after the Push communication is not necessary. Of course, the handshake control information management module 209 can determine that the Close processing after the Push communication is not necessary with a method other than that described above.

In step S700, in the case where the Close processing is determined to be necessary, the processing proceeds to step S701, and when that is not the case the processing proceeds to step S702. In this step S701, the handshake control information management module 209 sets the handshake control information so that after the Push communication finishes, the Close processing will be performed. On the other hand, in step S702, the handshake control information management module 209 sets the handshake control information so that after the Push communication finishes, the Close processing is not performed in order to perform a WebSocket session KeepAlive.

An example of the handshake control information that sets whether to perform the Close processing after the Push communication finishes is illustrated in FIG. 8. Note that although FIG. 8 illustrates an example in which a description is made in the XML format, the description may be made in other formats as well. In FIG. 8, whether to perform the Close processing after the Push communication is described in the close tag. Numerals 800, 801 and 802 in FIG. 8 denote second conditions corresponding respectively to first conditions 500, 501, and 502 illustrated in FIG. 5 explained in the first embodiment.

Figure 9:
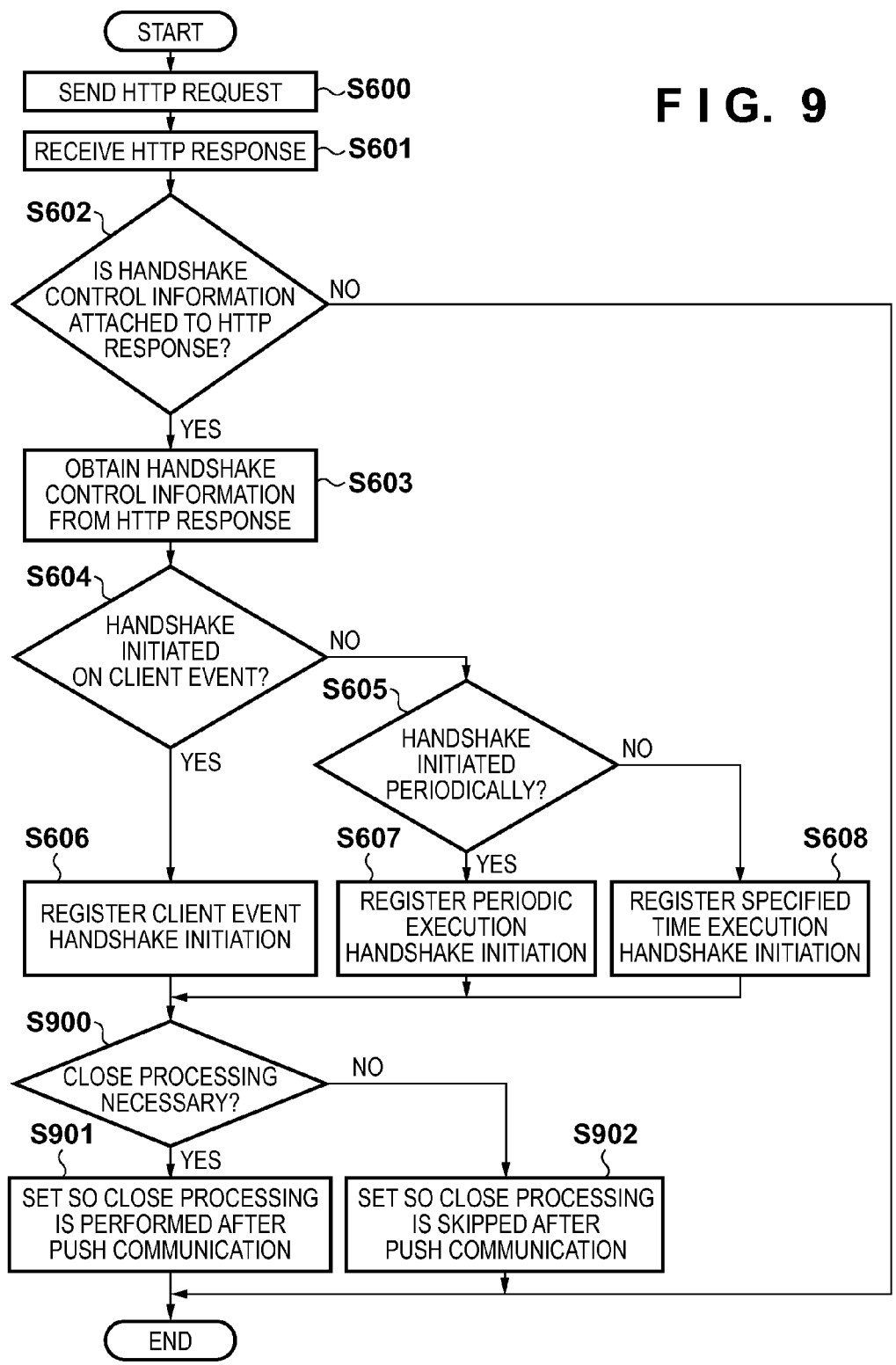
FIG. 9 is a flowchart for describing processing for when setting of whether Close processing will be performed.

Next, using the flowchart illustrated in FIG. 9, operation when, based on the HTTP response received when the client computer 120 transmits an HTTP request to the server computer 100, the client computer 120 determines and sets whether the Close processing is to be performed will be explained. Note, because part of this explanation overlaps with FIG. 6 of the first embodiment, and processing steps that are common to FIG. 6 are shown with similar reference numerals, and their explanation is omitted, and only differing parts will be explained below. A program that executes this processing is stored in the ROM 113 or in the external memory 116 and is loaded into the RAM 112 upon execution. Also, by the CPU 111 executing this program, the processing illustrated by this flowchart is realized.

In step S900, the handshake control information management module 225 determines whether the Close processing is necessary after the Push communication finishes based on the handshake control information obtained in step S603. Here, in the case where it is determined that the Close processing is necessary, the processing proceeds to step S901, and in the case where it is determined that it is not necessary, the processing proceeds to step S902. In step S901, the handshake control information management module 225 sets so that the Close processing will be performed after the Push communication, to be performed after initiation of the handshake registered with the WebSocket module 223 in one of steps S606 through step S608, finishes.

On the other hand, in step S902, the handshake control information management module 225 sets so that the Close processing will be skipped after the Push communication, to be performed after initiation of the handshake registered with the WebSocket module 223 in one of steps S606 through step S608, finishes.

Note, in the case where the Close processing will be skipped after the Push communication, the final Close processing of the WebSocket communication may be performed by either of the server computer 100 and the client computer 120. For example, in the case where the Close processing is performed from the server computer 100, the server computer 100 determines that a predetermined threshold time period has elapsed and no task scheduled for execution has been registered, and performs the Close processing. On the other hand, in the case where the Close processing is performed from the client computer 120, when a predetermined timeout interval elapses, the Close processing is performed.

According to the above processing, if the execution schedule interval of a registered Push communication task is within a fixed time period, the server computer 100 instructs a WebSocket session KeepAlive, and the Close processing after the Push communication finishes is skipped. Because of this, by continuing to use the connection for subsequent Push communications, it is possible to cut down on CPU load and time waste on the server computer 100.

Third Embodiment

In the second embodiment, if the execution schedule interval of a Push communication task is within a fixed time period, the server computer 100 instructs a WebSocket session KeepAlive.

In the third embodiment, in the case where a time specified or periodically executed handshake initiation is registered on the client computer 120, before performing the handshake initiation, a query as to whether there is a handshake request is made to the server computer 100.

Because the system configuration and the hardware configuration and software configuration of the Push communication type client/server system in the third embodiment are the same as those of FIG. 1 and FIG. 2 of the first embodiment, their explanation is omitted.

Also, because operation when the server computer 100 receives the HTTP request transmitted from the client computer 120 is the same as in FIG. 4 of the first embodiment, their explanation is omitted.

Figure 6:
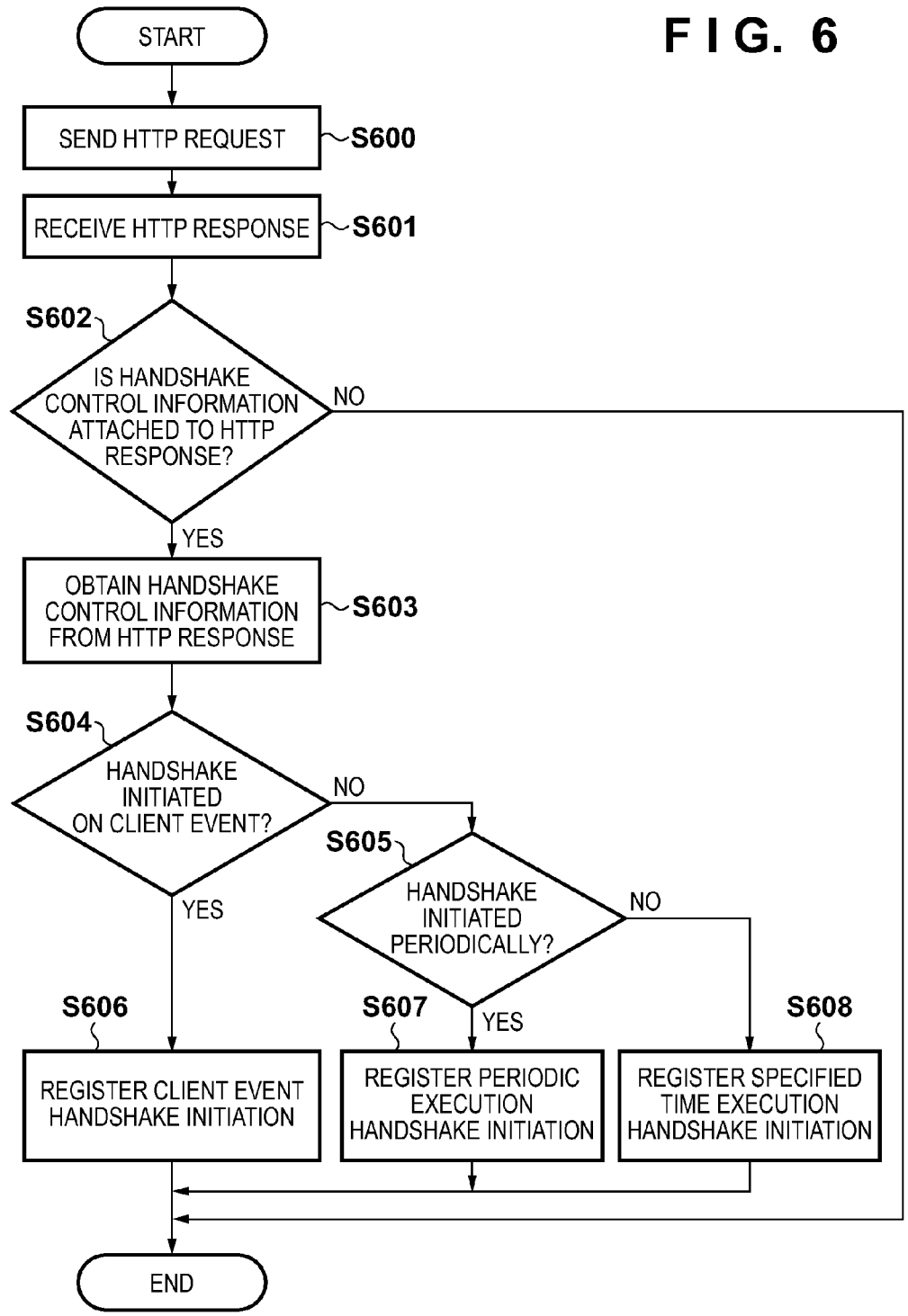
FIG. 6 is a flowchart for describing processing for when handshake initiation is registered.

Furthermore, because the operation when the client computer 120 registers handshake initiation based on an HTTP response received after transmitting an HTTP request to the server computer 100 is the same as that of FIG. 6 of the first embodiment, their explanation is omitted.

Figure 10:
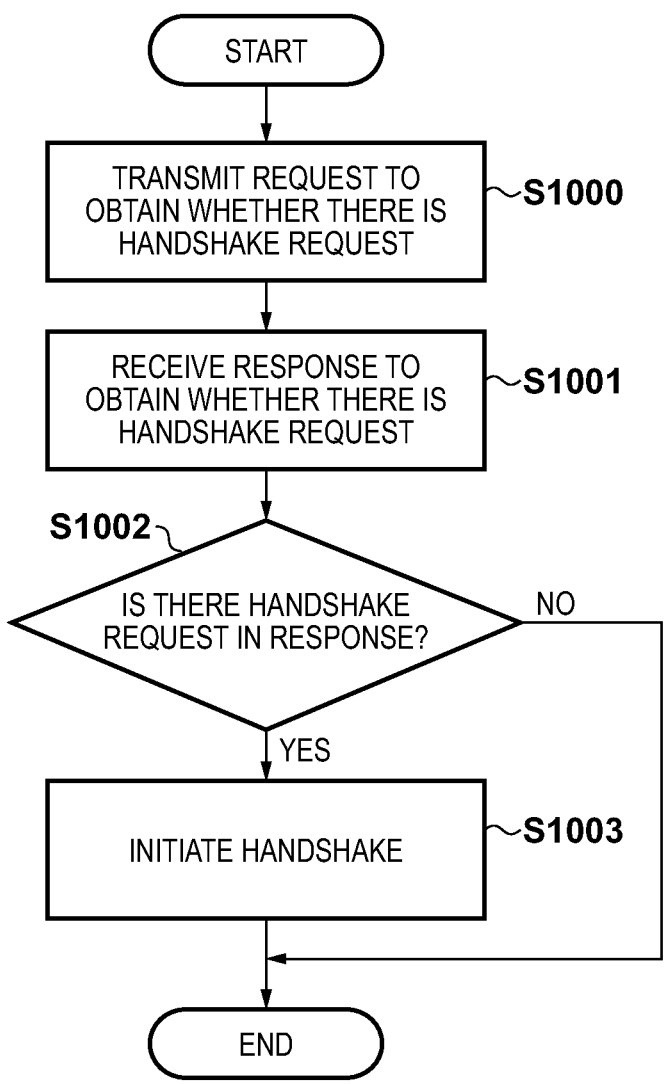
FIG. 10 is a flowchart for describing processing for initiating a handshake according to a third embodiment.

Here, operation for when the client computer 120 initiates a time specified or periodic execution handshake based on a handshake request will be explained using the flowchart shown in FIG. 10. A program that executes this processing is stored in the ROM 113 or in the external memory 116 and is loaded into the RAM 112 upon execution. Also, by the CPU 111 executing this program, the processing illustrated by this flowchart is realized.

Firstly, in step S1000, the handshake control information management module 225 transmits a request to obtain whether there is a handshake request via the network module 220 to the server computer 100. In step S1001, the handshake control information management module 225 receives a response transmitted from the server computer 100 via the network module 220. Next, in step S1002, the handshake control information management module 225 determines whether there is a handshake request based on the received response. In the case where the handshake control information management module 225 determines that there is a handshake request, the processing proceeds to step S1003, and the WebSocket module 223 initiates a WebSocket protocol handshake. On the other hand, in the case where the handshake control information management module 225 determines that there is no handshake request, processing is finished without initiating a handshake.

Figure 11:
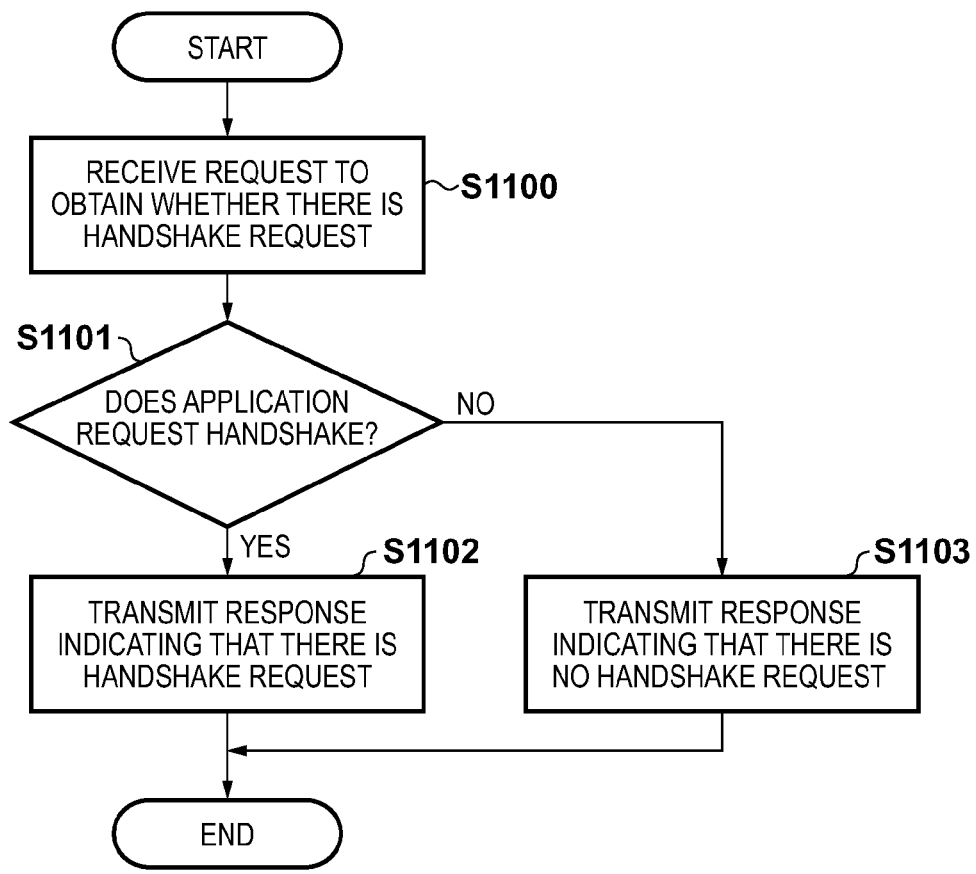
FIG. 11 is a flowchart for describing processing for transmitting a response according to the third embodiment.

Next, operation when the server computer 100 receives a request to obtain whether there is a handshake request from the client computer 120 and transmits a response will be explained using the flowchart illustrated in FIG. 11. A program that executes this processing is stored in the ROM 103 or in the external memory 106 and is loaded into the RAM 102 upon execution. Also, by the CPU 101 executing this program, the processing illustrated by this flowchart is realized.

Firstly, in step S1100, the handshake control information management module 209 receives a request to obtain whether there is a handshake request via the network module 200. In step S1101, the handshake control information management module 209 determines whether the application 205 is requesting a handshake. The determination of whether the application 205 is requesting a handshake is performed, for example, with the method described in the explanation of step S401 (FIG. 4) of the first embodiment.

Here, the case where it is determined that it is not necessary that a WebSocket session be established by a handshake, is a case where an emergency firmware upgrade instruction for the client computer 120 or multiple instructions whose number is greater than a threshold do not exist on the server computer 100.

In step S1101, in the case where it is determined that the application 205 is requesting a handshake, the processing proceeds to step S1102, and when that is not the case the processing proceeds to step S1103. In step S1102, the handshake control information management module 209 transmits as a response that there is a handshake request via the network module 200 to the client computer 120.

On the other hand, in step S1103, the handshake control information management module 209 transmits as a response that there is not a handshake request via the network module 200 to the client computer 120.

According to the above processing, in the case where a time specified or periodically executed handshake initiation is registered on the client computer 120, the client computer 120 confirms the presence of a handshake request on the server computer 100 before initiating the handshake. Thus, the number of unnecessary handshake initiations can be lessened, and more consumption than necessary of resources of the server computer 100 such as connections can be avoided.

Also, in the embodiment, the client computer 120 performs a request for whether a handshake is needed beforehand. However, even without performing this kind of request, in the case where the server computer 100 determines that it is unnecessary, it may ignore, or return an error, in response to a request for a handshake from the client computer 120. With this, it is possible to limit the establishing of unnecessary WebSocket sessions.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-108912, filed May 10, 2012, which is hereby incorporated by reference herein in its entirety.

The invention claimed is:

1. A server apparatus that communicates with a client apparatus via the Internet, the server apparatus comprising:
   a memory, and
   a processor in communication with the memory, the processor configured to control:
      a first communication unit configured to support a network communication in HTTP;
      a second communication unit configured to support a network communication in a specific communication mode in which instruction from the server apparatus is possible without a request from the client apparatus, wherein the specific communication mode is a protocol different from the HTTP;
      a receiving unit configured to receive a query from the client apparatus via the first communication unit;
      a transmitting unit configured to transmit, via the first communication unit, as a reply to the received query, first condition information including information of a condition triggering performance of an initial communication in order to switch to the specific communication mode, wherein the first condition information includes, as the information of the condition, information about a trigger event detected by the client apparatus; and
      an instructing unit configured to switch to the specific communication mode by performing the initial communication with the client apparatus according to the first condition information, and configured to transmit, via the second communication unit, an instruction to the client apparatus in the specific communication mode.

2. The server apparatus according to claim 1, wherein the specific communication mode uses a WebSocket protocol.

3. The server apparatus according to claim 2, wherein the initial communication is a handshake of the WebSocket protocol.

4. The server apparatus according to claim 1, wherein the first condition information further includes, as the information of the condition, at least one of schedule information and a time period.

5. The server apparatus according to claim 1, wherein the client apparatus is an image forming apparatus.

6. The server apparatus according to claim 1, further comprising a disconnection configured to disconnect communication in the specific communication mode according to second condition information corresponding to the first condition information.

7. The server apparatus according to claim 6, wherein the disconnection unit, in a case where there is no instruction to be transmitted to the client apparatus as the second condition information, disconnects communication in the specific communication mode.

8. The server apparatus according to claim 1, further comprising a control unit configured to control, in a case where there is no instruction to be transmitted to the client apparatus when the initial communication is performed from the client apparatus according to the first condition information, so as not to switch to the specific communication mode.

9. A control method for controlling a server apparatus that communicates with a client apparatus via the Internet, the control method comprising steps of:
supporting a network communication in HTTP;
supporting a network communication in a specific communication mode in which instruction from the server apparatus is possible without a request from the client apparatus, wherein the specific communication mode is a protocol different from the HTTP;
receiving a query from the client apparatus via the network communication in the HTTP;
transmitting, via the network communication in the HTTP, as a reply to the received query, first condition information including information of a condition triggering performance of an initial communication in order to switch to the specific communication mode, wherein the first condition information includes, as the information of the condition, information about a trigger event detected by the client apparatus; and
switching to the specific communication mode by performing the initial communication with the client apparatus according to the first condition information, and transmitting, in the specific communication mode, an instruction to the client apparatus in the specific communication mode.

10. The control method according to claim 9, wherein the specific communication mode uses a WebSocket protocol.

11. The control method according to claim 9, wherein the first condition information further includes, as the information of the condition, at least one of schedule information and a time period.

12. The control method according to claim 9, further comprising a step of disconnecting communication in the specific communication mode according to second condition information corresponding to the first condition information.

13. The control method according to claim 12, wherein in the disconnecting step, in a case where there is no instruction to be transmitted to the client apparatus as the second condition information, communication in the specific communication mode is disconnected.

14. The control method according to claim 9, further comprising a step of controlling, in a case where there is no instruction to be transmitted to the client apparatus when the initial communication is performed from the client apparatus according to the first condition information, so as not to switch to the specific communication mode.

15. A non-transitory computer-readable storage medium storing a program for causing a computer to function as the server apparatus according to claim 1.

16. A system having a client apparatus and a server apparatus that communicates with said client apparatus via the Internet, wherein the server apparatus comprises:
a memory, and
a processor in communication with the memory, the processor configured to control:
a first communication unit configured to support a network communication in HTTP;
a second communication configured to support a network communication in a specific communication mode in which instruction from the server apparatus is possible without a request from the client apparatus, wherein the specific communication mode is a protocol different from the HTTP;
a receiving unit configured to receive a query from the client apparatus via the first communication unit;
a transmitting unit configured to transmit, via the first communication unit, as a reply to the received query, first condition information including information of a condition triggering performance of an initial communication in order to switch to the specific communication mode, wherein the first condition information includes, as the information of the condition, information about a trigger event detected by the client apparatus; and
an instructing unit configured to switch to the specific communication mode by performing the initial communication with the client apparatus according to the first condition information, and configured to transmit, via the second communication unit, instruction to the client apparatus in the specific communication mode even if there is no request from the client apparatus, and
wherein the client apparatus comprises:
a receiving unit configured to receive from the server apparatus the first condition information and
a control unit configured to initiate the initial communication with the server apparatus according to the first condition information received by said receiving unit.

17. The system according to claim 16, wherein the specific communication mode uses a WebSocket protocol.

18. The system according to claim 16, wherein the first condition information further includes, as the information of the condition, at least one of schedule information and a time period.

19. The system according to claim 16, wherein the client apparatus is an image forming apparatus.

20. The system according to claim 16, wherein the server apparatus further comprises a disconnection unit configured to disconnect communication in the specific communication mode according to second condition information corresponding to the first condition information.

21. The system according to claim 20, wherein said disconnection unit, in a case where there is no instruction to be transmitted to the client apparatus as the second condition information, disconnects communication in the specific communication mode.

22. The system according to claim 16, wherein the server apparatus controls, in a case where there is no instruction to be transmitted to the client apparatus when the initial communication is performed from the client apparatus according to the first condition information, so as not to switch to the specific communication mode.

23. A control method for a system having a client apparatus and a server apparatus that communicates with the client apparatus via the Internet,
wherein the server apparatus executes steps of:
supporting a network communication in HTTP;
supporting a network communication in a specific communication mode in which instruction from the server apparatus is possible without a request from the client apparatus is possible without a request from the client apparatus, wherein the specific communication mode is a protocol different from the HTTP;
receiving a query from the client apparatus in the HTTP;

transmitting, via the network communication in the HTTP, as a reply to the received query, first condition information including information of a condition triggering performance of an initial communication in order to switch to the specific communication mode, wherein the first condition information includes, as the information of the condition, information about a trigger event detected by the client apparatus; and switching to the specific communication mode by performing the initial communication with the client apparatus according to the first condition information, and transmitting, in the second communication mode, an instruction to the client apparatus in the specific communication mode even if there is no request from the client apparatus, and wherein the client apparatus executes steps of:

receiving from the server apparatus the first condition information; and initiating the initial communication with the server apparatus according to the received first condition information.

* * * * *